United States Patent
Kuo et al.

(10) Patent No.: US 9,624,130 B2
(45) Date of Patent: Apr. 18, 2017

(54) OPTIMIZING POLYCARBOXYLATE ADMIXTURES FOR CEMENTITIOUS COMPOSITIONS

(71) Applicant: GCP Applied Technologies Inc., Cambridge, MA (US)

(72) Inventors: Lawrence L. Kuo, Acton, MA (US); Keith St Jean, Leominster, MA (US); Yohannes K. Lemma, Revere, MA (US); Nathan A. Tregger, Northborough, MA (US); Stephen P. Klaus, Waban, MA (US); Danila F. Ferraz, Sorocaba (BR); Klaus-Alexander Rieder, Beverly, MA (US); Pierre Estephane, Dubai (AE)

(73) Assignee: GCP Applied Technologies Inc., Cambridge, MA (US)

( * ) Notice: Subject to any disclaimer, the term of this patent is extended or adjusted under 35 U.S.C. 154(b) by 0 days.

(21) Appl. No.: 15/016,877

(22) Filed: Feb. 5, 2016

(65) Prior Publication Data
US 2016/0362337 A1 Dec. 15, 2016

Related U.S. Application Data

(63) Continuation-in-part of application No. 14/739,142, filed on Jun. 15, 2015, now Pat. No. 9,546,110.

(51) Int. Cl.
| | |
|---|---|
| C08F 8/34 | (2006.01) |
| C08K 3/00 | (2006.01) |
| C04B 24/12 | (2006.01) |
| C04B 24/26 | (2006.01) |
| C04B 24/06 | (2006.01) |

(52) U.S. Cl.
CPC .......... *C04B 24/2647* (2013.01); *C04B 24/06* (2013.01)

(58) Field of Classification Search
CPC .............. C04B 24/2641; C04B 24/2647
See application file for complete search history.

(56) References Cited

U.S. PATENT DOCUMENTS

| | | | |
|---|---|---|---|
| 6,187,841 B1 | 2/2001 | Tanaka et al. | |
| 6,569,234 B2 * | 5/2003 | Yamashita | C04B 24/2647 106/696 |
| 8,058,377 B1 | 11/2011 | Goc-Maciejewska et al. | |
| 8,070,875 B2 | 12/2011 | Jeknavorian et al. | |
| 8,685,156 B2 | 4/2014 | Koyata et al. | |
| 2006/0223914 A1 | 10/2006 | Yuasa et al. | |
| 2007/0043190 A1 | 2/2007 | Kraus et al. | |
| 2009/0176925 A1 | 7/2009 | Matsunaga et al. | |
| 2009/0312460 A1 * | 12/2009 | Lorenz | C04B 24/2647 524/5 |
| 2011/0029134 A1 | 2/2011 | Hazrati et al. | |
| 2013/0231415 A1 | 9/2013 | Page et al. | |
| 2014/0323614 A1 | 10/2014 | Villard et al. | |
| 2015/0133584 A1 * | 5/2015 | Kuo | C04B 24/2647 524/5 |

FOREIGN PATENT DOCUMENTS

WO 2013182595 12/2013

OTHER PUBLICATIONS

Young, Form PCT/ISA/220, International Search Report for PCT/US2016/037209, dated Sep. 1, 2016, 2 pages.
Young, Form PCT/ISA/237, Written Opinion of the International Searching Authority for PCT/US2016/037209, dated Sep. 1, 2016, 2 pages.

* cited by examiner

*Primary Examiner* — Robert Harlan
(74) *Attorney, Agent, or Firm* — Craig K. Leon

(57) ABSTRACT

The present invention provides a composition and method for modifying a hydratable cementitious composition such as concrete or mortar using at least three different, distinct carboxylate polymers, even when clay is present in the concrete or mortar that would otherwise diminish dosage efficiency of polycarboxylate polymer used as dispersant. The three polycarboxylate polymers, designated as Polymer I, Polymer II, and Polymer II, are derived from monomer Components A, B, and C wherein Component A is an unsaturated carboxylic acid, Component B is a polyoxyalkylene, and Component C is an unsaturated carboxylate ester. The component molar ratio ranges for A:B:C are different as between Polymers I and II; while a distinct component molar ratio A:B+C is identified for Polymer III. When treated with these three different polycarboxylate polymers, the hydratable cementitious composition is surprisingly enhanced in terms of initial workability and slump retention, especially if clay is present.

15 Claims, No Drawings

OPTIMIZING POLYCARBOXYLATE ADMIXTURES FOR CEMENTITIOUS COMPOSITIONS

FIELD OF THE INVENTION

The present invention relates to modification of properties in hydratable cementitious materials; and, more particularly, it discloses an admixture composition and method involving three distinct polyoxyalkylene polycarboxylate polymers for achieving workability and slump retention in a concrete mix which may or may not contain a clay that otherwise diminishes dosage efficiency of polycarboxylates used as dispersants in the concrete mix.

BACKGROUND OF THE INVENTION

In U.S. Pat. No. 8,685,156 (owned by W. R. Grace & Co.-Conn.), Koyata et al. disclosed that the use of polycationic compounds in combination with hydroxycarboxylic compounds enhanced slump retention in concretes having clay-bearing aggregates, in which the clay otherwise absorbs or diminishes the dosage efficiency of the polycarboxylate superplasticizers.

In US Patent Publication No. US 2014/0323614 A1 (owned by Lafarge), Villard et al. disclosed a mixture for treating concrete which included an inerting agent for at least partially neutralizing harmful effects of impurities on the workability of the concrete, a first superplasticizer that was different from the inerting agent, and a second superplasticizer that was different from the first super-plasticizer and the inerting agent. The two superplasticizers taught by Villard et al. differed in that one of the superplasticizers had a maximum plasticizing action developing after the peak of the plasticizing action of the other superplasticizer.

The present inventors believe that a novel and inventive super-plasticizing admixture for modifying concrete, particularly when clay contaminants are present, is needed.

SUMMARY OF THE INVENTION

The present invention provides a novel admixture composition for enhancing slump development and slump retention in hydratable cementitious compositions, such as concrete, especially when a clay contaminant is present. By combining three distinct polyoxyalkylene carboxylate polymers, the present inventors surprisingly discovered that workability (slump) and workability retention of concrete were significantly improved, especially when clay was present. In view of the fact that chloride-containing compounds such as epichlorohydrin-dimethylamine (EPI-DMA) are becoming widely used for inerting clay, the fact that the present invention does not require the use of chloride-containing compounds is advantageous.

An exemplary additive composition of the present invention for modifying a hydratable cementitious composition, comprises: three different carboxylate polymers, identified herein as Polymer I, Polymer II, and Polymer III, each of said polymers being obtained from monomer Components A, B, and C, wherein Component A is an unsaturated carboxylic acid monomer represented by structural formula 1,

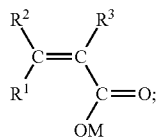

[formula 1]

Component B is a polyoxyalkylene monomer represented by structural formula 2:

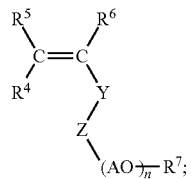

[formula 2]

Component C is an unsaturated carboxylate ester or amide monomer represented by structural formula 3:

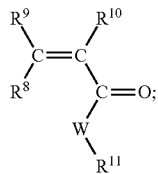

[formula 3]

wherein $R^1$, $R^2$, $R^3$, $R^4$, $R^5$, $R^6$, $R^7$, $R^8$, $R^9$, and $R^{10}$ each individually represent a hydrogen atom, a $C_1$ to $C_4$ alkyl group, or —COOM group wherein M represents a hydrogen atom or an alkali metal; Y represents —$(CH_2)_p$— wherein "p" represents an integer of 0 to 6; Z represents —O—, —COO—, —OCO—, —COHN—, or —NHCO— group; -$(AO)_n$ represents repeating ethylene oxide groups, propylene oxide groups, butylene oxide groups, or a mixture thereof; "n" represents the average number of repeating -(AO)- groups and is an integer of from 10 to 250; W represents an oxygen atom or an —NH— group, and $R^{11}$ represents a $C_1$-$C_{10}$ alkyl group or a $C_2$-$C_{10}$ hydroxyalkyl group; wherein, in Polymer I, the Components A, B, and C are present in a molar ratio (A:B:C) in the range of 2:1:0 to 5:1:0; and further wherein, in Polymer II, the Components A, B, and C are present in a molar ratio (A:B:C) in the range of 0.1:1:0 to 2:1:0; and further wherein, in Polymer III, the molar ratio of Component A to the sum of Components B and C is in the range (A:B+C) of 0.3:1 to 3:1.

The present invention also provides methods wherein hydratable cementitious compositions are modified using the above-described Polymers I, II, and III, and also provides cementitious compositions obtained by using the above-described polymers.

Further advantages and benefits of the invention are described in further detail hereinafter.

DETAILED DESCRIPTION OF EXEMPLARY EMBODIMENTS

A particular description of a compound in its acid form (e.g., polycarboxylic acid, gluconic acid, etc.) shall be understood, where context permits, to include the salt form (e.g., polycarboxylate, gluconate); and, conversely, a description of a compound in its salt form shall be understood to include its acid form.

The terms "cement" and "cementitious" composition as used herein includes hydratable cement and Portland cement which is produced by pulverizing clinker consisting of hydraulic calcium silicates and one or more forms of calcium sulfate (e.g., gypsum) as an interground additive. Typically, Portland cement is combined with one or more supplemental cementitious materials, such as Portland cement, fly ash, granulated blast furnace slag, limestone, natural pozzolans, or mixtures thereof, and provided as a blend. The term "cementitious" refers to materials that comprise Portland cement or which otherwise function as a binder to hold together fine aggregates (e.g., sand), coarse aggregates (e.g., crushed stone, rock, gravel), or mixtures thereof.

The term "hydratable" is intended to refer to cement or cementitious materials that are hardened by chemical interaction with water. Portland cement clinker is a partially fused mass primarily composed of hydratable calcium silicates. The calcium silicates are essentially a mixture of tricalcium silicate ($3CaO \cdot SiO_2$, "$C_3S$" in cement chemists notation) and dicalcium silicate ($2CaO \cdot SiO_2$, "$C_2S$") in which the former is the dominant form, with lesser amounts of tricalcium aluminate ($3CaO \cdot Al_2O_3$, "$C_3A$") and tetracalcium aluminoferrite ($4CaO \cdot Al_2O_3 \cdot Fe_2O_3$, "$C_4AF$"). See e.g., Dodson, Vance H., Concrete Admixtures (Van Nostrand Reinhold, New York N.Y. 1990), page 1.

The term "concrete" will be used herein generally to refer to a hydratable cementitious mixture comprising water, cement, sand, usually a coarse aggregate such as crushed stone, rock, or gravel, and optional chemical admixture(s).

The term "clay" as used herein will typically refer to clays that are born or carried by aggregates such as sand and/or coarse aggregates such as crushed gravel, rock, or stone. The present invention relates to treatment of all types of clays. The clays may include but are not limited to swelling clays of the 2:1 type (such as smectite type clays) or also of type 1:1 (such as kaolinite) or of the 2:1:1 type (such as chlorite). The term "clays" has referred to aluminum and/or magnesium silicates, including phyllosilicates having a lamellar structure; but the term "clay" as used herein may also refer to clays not having such structures, such as amorphous clays.

The present invention is also not limited to clays which absorb polyoxyalkylene superplasticizers (such as ones containing ethylene oxide ("EO") and/or propylene oxide ("PO") groups), but it also includes clays that directly affect the properties of construction materials, whether in their wet or hardened state. Clays which are commonly found in sands include, for example, montmorillonite, illite, kaolinite, muscovite, and chlorite. These are also included in the methods and compositions of the present invention.

The term "sand" as used herein shall mean and refer to aggregate particles usually used for construction materials such as concrete, mortar, and asphalt, and this typically involves granular particles of average size between 0 and 8 mm, preferably between 2 and 6 mm. Sand aggregates may comprise calciferous, siliceous or siliceous limestone minerals. Such sands may be natural sand (e.g., derived from glacial, alluvial, or marine deposits which are typically weathered such that the particles have smooth surfaces) or may be of the "manufactured" type, which are made using mechanical crushers or grinding devices.

As previously summarized, an exemplary composition of the present invention for modifying a hydratable cementitious composition, comprises: three different carboxylate polymers, identified herein as Polymer I, Polymer II, and Polymer III, each of said polymers being obtained from monomer Components A, B, and C, wherein: Component A is an unsaturated carboxylic acid monomer represented by structural formula 1,

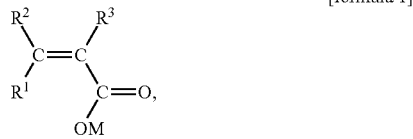

[formula 1]

Component B is a polyoxyalkylene monomer represented by structural formula 2:

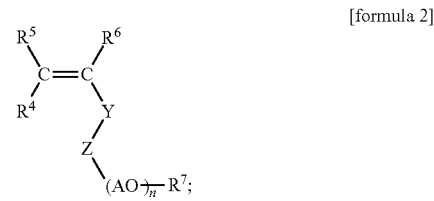

[formula 2]

Component C is an unsaturated carboxylate ester or amide monomer represented by structural formula 3:

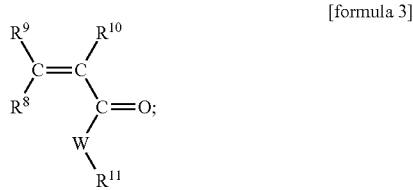

[formula 3]

wherein $R^1$, $R^2$, $R^3$, $R^4$, $R^5$, $R^6$, $R^7$, $R^8$, $R^9$, and $R^{10}$ each individually represent a hydrogen atom, a $C_1$ to $C_4$ alkyl group, or —COOM group wherein M represents a hydrogen atom or an alkali metal; Y represents —$(CH_2)_p$— wherein "p" represents an integer of 0 to 6; Z represents —O—, —COO—, —OCO—, —COHN—, or —NHCO—; -(AO)$_n$ represents repeating ethylene oxide groups, propylene oxide groups, butylene oxide groups, or a mixture thereof; "n" represents the average number of repeating -(AO) groups and is an integer of from 10 to 250; W represents an oxygen atom or an —NH— group, and $R^{11}$ represents a $C_1$-$C_{10}$ alkyl group or a $C_2$-$C_{10}$ hydroxyalkyl group; wherein, in Polymer I, the Components A, B, and C are present in a molar ratio (A:B:C) in the range of 2:1:0 to 5:1:0; and further wherein, in Polymer II, the Components A, B, and C are present in a molar ratio (A:B:C) in the range of 0.1:1:0 to 2:1:0; and further wherein, in Polymer III, the molar ratio of Component A to the sum of Components B and C is in the range (A:B+C) of 0.3:1 to 3:1.

In Polymer I, while an exemplary molar ratio of Component A to Component B is given above in the range (A:B) of 2:1 to 5:1, it is more preferably in the range (A:B) of 2.3:1 to 4.5:1; and, most preferably, it is in the range (A:B) of 2.5:1 to 4.0:1.

In Polymer II, while an exemplary molar ratio of Component A to Component B is given above in the range (A:B) of 0.1:1 to 2:1, it is more preferably in the range (A:B) of 0.6:1 to 1.7:1.

In Polymer III, while the exemplary molar ratio of Component A to the sum of Components B and C is given above in the range (A:B+C) of 0.3:1 to 3:1; it is more preferably in the range (A:B+C) of 0.4:1 to 2:1; and it is most preferably in the range (A:B+C) of 0.5:1 to 1:1.

A preferred weight-average molecular weight for Polymers I, II, and III is in the range of 10,000 to 300,000, and, more preferably, it is in the range of 20,000 to 200,000. Although not critical to the present invention, the molecular weight is preferably determined using gel permeation chromatography (GPC) using ULTRAHYDROGEL™ columns at a column temperature of 35° C., using polyethylene glycol (PEG) standards, using 1% aqueous potassium nitrate as elution solvent at a flow rate of 0.6 mL/min. and injection volume of 80 μL, and using refractive index detection.

Exemplary Component A monomers believed to be suitable for use in the present invention include acrylic acid, methacrylic acid, maleic acid, $C_1$-$C_4$ alkyl maleic monoester, maleic monoamide, N—($C_1$-$C_4$) alkyl maleic monoamide, fumaric acid, $C_1$-$C_4$ alkyl fumaric monoester, N—($C_1$-$C_4$) alkyl fumaric monoamide, crotonic acid, itaconic acid, or a mixture thereof.

Exemplary Component B monomers believed to be suitable for use in the present invention include poly(alkylene glycol)methyl ether acrylate, poly(alkylene glycol)ethyl ether acrylate, poly(alkylene glycol)methyl ether methacrylate, poly(alkylene glycol)ethyl ether methacrylate, poly(alkylene glycol)methyl ether maleate monoester, poly(alkylene glycol)ethyl ether maleate monoester, poly(alkylene glycol)methyl ether fumarate monoester, N-poly(alkylene glycol) acrylamide, N-poly(alkylene glycol) methacrylamide, poly(alkylene glycol) vinyl ether, poly(alkylene glycol) allyl ether, poly(alkylene glycol) methallyl ether, poly(alkylene glycol) isoprenyl ether, poly(alkylene glycol) vinyloxybutylene ether, or mixture thereof; and wherein the nominal molecular weight of the polyalkylene glycol is in the range of 450 to 11,000, more preferably in the range of 1,000 and 8,000, and most preferably in the range of 2,000 to 5,000.

Exemplary Component C monomers believed to be suitable for use in the present invention include alkyl (meth) acrylate, a hydroxyalkyl (meth)acrylate, (meth)acrylamide or derivative thereof, an alkyl maleic diester, a hydroxyalkyl maleic diester, or a mixture thereof. For example, the alkyl (meth)acrylate may be selected from the group consisting of methyl (meth)acrylate, ethyl (meth)acrylate, propyl (meth) acrylate, and butyl (meth)acrylate. As another example, the hydroxyalkyl (meth)acrylate may be selected from the group consisting of hydroxyethyl (meth)acrylate, hydroxypropyl (meth)acrylate, and hydroxybutyl (meth)acrylate.

Exemplary polycarboxylate admixture of the invention comprises at least the three distinct polyoxyalkylene polycarboxylate polymers, wherein the active weight percentages of each polymer to the sum of the three polymers within the inventive admixture are:

(i) Polymer I in the 30-80% range; it is more preferably in the 35-75% range; and it is most preferably in the 40-70% range.

(ii) Polymer II in the 5-40% range; it is more preferably in the 10-35% range; and it is most preferably in the 10-30% range.

(iii) Polymer III in the 5-50% range; it is more preferably in the 10-45% range; and it is most preferably in the 15-40% range; all percentages herein being expressed in terms of the total weight of the polymers.

Exemplary compositions of the invention, in addition to including three Polymers I, II, and III as described above, may further comprise at least one conventional concrete admixture selected from the group consisting of water reducer, accelerator, retarder, strength enhancing agent, air detraining agent (e.g., defoamers), air entraining agent, shrinkage reducing admixture, or a mixture thereof. For example, an exemplary additive composition or method of the invention may further include the use of a water reducer selected from the group consisting of lignosulfonates, naphthalene sulfonate formaldehyde condensates, melamine sulfonate formaldehyde condensates, a gluconic acid or gluconate, corn syrup, or a mixture thereof. Still further exemplary embodiments may include the use of at least one strength enhancer. For example, the strength enhancers may be an alkanolamine, and more preferably a tertiary alkanolamine selected from triethanolamine, triisopropanolamine, diethanol isopropanolamine, ethanol diisopropanolamine, tetra(hydroxyethyl) ethylene diamine, tetra(hydroxypropyl) ethylene diamine, methyl diethanolamine, or mixture thereof. As many or most of these tend to entrain air in the cementitious mixture, the use of an air detraining agent (e.g., defoamer) would be preferred.

Hence, the present inventors believe that the various conventional admixtures may be combined with the use of the aforementioned Polymers I, II, and III, and the selection of such conventional admixtures would likely be governed by the preferences of the user or customer, or the formulation designer who will take into consideration factors such as compatibility for neutral and high pH (>7) applications.

An exemplary method of the present invention for modifying a cementitious composition (such as concrete), thus comprises: introducing into a hydratable cementitious composition said Polymers I, II, and III, either simultaneously or at different times. For example, each or all or a sub-combination of Polymers I, II, and III can be introduced into a cementitious composition at a concrete batch mix plant, introduced into a cementitious composition during transport in a ready-mix truck, or both. For example, a portion of the Polymers I, II, and III can be dosed into the concrete mix during initial batching at the concrete plant, during delivery at the construction/job site (just before the concrete is poured), during transport in the ready-mix delivery truck between the batch plant and job site (preferably using an automated slump monitoring system such as available from Verifi LLC, a subsidiary of W. R. Grace & Co.-Conn., Cambridge, Mass. USA); or a combination of any or all of these.

The present invention also provides cementitious compositions comprising a cementitious binder and the additive composition comprising Polymers I, II, and III, optionally with at least one other conventional admixture. As the present invention is believed to be suitable for treating concrete that contains clay-bearing aggregates, wherein the clay otherwise detrimentally affects dosage efficiency of polycarboxylate dispersants, the preferred cementitious compositions would further comprise, in addition to Polymers I, II, and III, aggregates and clay.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples.

All parts and percentages in the examples, as may be set forth herein and hereinafter, are by percentage dry weight unless otherwise specified.

Example 1

A) Polymers

Three different polyoxyalkylene carboxylate polymers were synthesized via conventional radical polymerization in aqueous solution and their chemical compositions are summarized in Table 1.

TABLE 1

| Polymer | Monomer (A) | Monomer (B) | Monomer (C) | Molar Ratio of (A)/(B + C) | Mw by GPC |
|---|---|---|---|---|---|
| I | acrylic acid | isoprenyl polyethylene glycol ether-2,000 | none | 4.2 | 38,000 |
| II | acrylic acid | polyethylene glycol-3,000 methacrylate | none | 1.2 | 120,000 |
| III | acrylic acid | isoprenyl polyethylene glycol ether-2,000 | methacrylate ester | 2.2 | 28,000 |

These polymers differ in their monomer component molar ratios and molecular weights. The weight-average molecular weights were measured by aqueous gel permeation chromatography (GPC) using polyethylene glycol as standard.

B) Concrete Test

The performance of the polyoxyalkylene carboxylate polymers was evaluated in concrete having the mix design shown in Table 2 below.

TABLE 2

| Constituent | Weight (lb) |
|---|---|
| Cement | 650 |
| Sand | 1,435 |
| Stone (3/8 inch) | 425 |
| Stone (1/2 inch) | 425 |
| Stone (3/4 inch) | 850 |
| Water | 275 |
| Sodium montmorillonite (dry) | 1.435 |
| Defoaming agent | 2~5 grams |
| Polycarboxylates | varied |

In all concrete mixes, sodium montmorillonite (commercially available under the trade name POLARGEL® from American Colloid Company, Illinois, USA) was used as clay and was pre-hydrated overnight by forming a 5 wt % suspension in water. The dry weight of sodium montmorillonite was 1.435 pounds or 0.10% by weight of sand while the total amount of solid polycarboxylate polymers was 0.15% by weight of cement.

The concrete mixing procedure was as follows: (1) mix sand, stone, and clay suspension for 30 seconds; (2) add water and defoaming agent and mix for 1 minute; (3) add cement and mix for 1 minute; (4) add polycarboxylate and mix for 3 minutes; (5) stop mixer and rest for 3 minutes; (6) re-mix for 2 minutes. After mixing, the slump was determined after different time intervals. The results are shown in Table 3 below.

TABLE 3

| Mix No. | Dosage (% solid/cement) of polymer | | | | Slump (inch) measured at | | | |
|---|---|---|---|---|---|---|---|---|
| | [I] | [II] | [III] | [I] + [II] + [III] | 9 min. | 30 min. | 50 min. | 70 min. |
| #1 | 0.030 | 0.015 | 0.105 | 0.150 | 8.75 | 7.25 | 6.25 | 3.75 |
| #2 | 0.038 | 0.015 | 0.097 | 0.150 | 9.00 | 7.75 | 5.00 | 3.00 |
| #3 | 0.150 | — | — | 0.150 | 8.75 | 3.75 | — | — |
| #4 | — | 0.150 | — | 0.150 | 2.00 | 1.00 | — | — |
| #5 | — | — | 0.150 | 0.150 | 6.75 | 6.75 | 5.50 | 3.25 |
| #6 | 0.135 | 0.015 | — | 0.150 | 8.75 | 7.50 | 4.25 | — |
| #7 | 0.135 | — | 0.015 | 0.150 | 8.50 | 7.25 | 5.00 | — |
| #8 | — | 0.015 | 0.135 | 0.150 | 6.00 | 7.00 | 4.25 | — |

The data in Table 3 provides evidence that the combinations of the three polycarboxylate polymers [I], [II], and [III] (See mixes #1 and #2) exhibited excellent initial slump and slump life (extended workability) as compared to the polymers used individually (See mixes #3, #4, #5) or as compared to only two polymers being used in combination (See mixes #6, #7, #8).

Example 2

This example illustrates the effectiveness of the combinations of the three polyoxyalkylene carboxylate polymers in concrete wherein the amount of dry sodium montmorillonite was increased to 2.870 pounds or 0.20% by weight of sand. In these mixes, the total amount of solid polycarboxylate polymers was 0.18% by weight of cement. The concrete composition and mixing procedure are identical to those described in Example 1, except that the total amount of water is increased to 270 pounds, yielding a water/cement weight ratio of 0.415. The results are shown in Table 4 below.

TABLE 4

| Mix No. | Dosage (% solid/cement) of polymer | | | | Slump (inch) measured at | | |
|---|---|---|---|---|---|---|---|
| | [I] | [II] | [III] | [I] + [II] + [III] | 9 min. | 30 min. | 50 min. |
| #9 | 0.135 | 0.018 | 0.027 | 0.180 | 9.00 | 6.75 | 4.00 |
| #10 | 0.099 | 0.018 | 0.063 | 0.180 | 8.50 | 6.50 | 3.75 |
| #11 | 0.180 | 0 | 0 | 0.180 | 8.25 | 4.00 | 2.00 |
| #12 | 0 | 0.180 | 0 | 0.180 | 3.00 | — | — |
| #13 | 0 | 0 | 0.180 | 0.180 | 5.50 | 5.50 | 3.50 |
| #14 | 0.162 | 0.018 | 0 | 0.180 | 9.00 | 4.75 | 3.00 |
| #15 | 0.162 | 0 | 0.018 | 0.180 | 8.25 | 4.25 | 3.25 |
| #16 | 0 | 0.018 | 0.162 | 0.180 | 4.24 | 4.00 | — |

As shown in Table 4, when all three polyoxyalkylene carboxylate polymers are used in combination in accordance with the teachings of the present invention (See mixes #9 and #10), the concrete demonstrated surprisingly better initial and retained slump when compared to use of only individual polymers (See mixes #11, #12, and #13) and compared to use of only two of the polymers (See mixes #14, #15, and #16).

Example 3

As further evidence to demonstrate the effectiveness of the present invention, the polyoxyalkylene carboxylate polymers were evaluated in concrete wherein the amount of dry sodium montmorillonite was increased to 4.305 pounds or 0.30 percent by weight of sand.

The concrete composition and mixing procedure are identical to those described in Example 1, except that the total amount of water is increased to 275 pounds, yielding a water/cement weight ratio of 0.423. The results are summarized in Table 5 below.

TABLE 5

| Mix No. | Dosage (% solid/cement) of polymer | | | | Slump (inch) measured at | | | |
|---|---|---|---|---|---|---|---|---|
| | [I] | [II] | [III] | [I] + [II] + [III] | 9 min. | 30 min. | 50 min. | 70 min. |
| #17 | 0.044 | 0.022 | 0.154 | 0.220 | 8.25 | 7.00 | 5.50 | 3.50 |
| #18 | 0.066 | 0.022 | 0.132 | 0.220 | 8.50 | 7.25 | 4.75 | 3.25 |
| #19 | 0.220 | 0 | 0 | 0.220 | 8.00 | 4.00 | — | — |
| #20 | 0 | 0.220 | 0 | 0.220 | 3.00 | — | — | — |
| #21 | 0 | 0 | 0.220 | 0.220 | 4.00 | 6.00 | 4.50 | — |
| #22 | 0.198 | 0.022 | 0 | 0.220 | 8.00 | 5.25 | 3.50 | — |
| #23 | 0.198 | 0 | 0.022 | 0.220 | 7.50 | 5.25 | 3.50 | — |
| #24 | 0 | 0.022 | 0.198 | 0.220 | 4.25 | 6.25 | 4.50 | — |

The results of Table 5 clearly show that the present combinations of the three polyoxyalkylene carboxylate polymers (mixes #17 and #18) used in accordance with the present invention provide high initial slumps and retain a high slump over a sustained period as compared to the reference mixes (mix #19 to mix #24) at the same dosage.

Example 4

This example illustrates the effect of the relative amounts of the three polyoxyalkylene carboxylate polymers in concrete wherein the amount of dry sodium montmorillonite was 3.588 pounds or 0.25% by weight of sand. In these mixes, the total amount of solid polycarboxylate polymers was 0.16% by weight of cement. The concrete composition and mixing procedure are identical to those described in Example 1, except that the total amount of water is 260 pounds, yielding a water/cement weight ratio of 0.400. The results are shown in Table 6 below.

TABLE 6

| Mix No. | Percentage of active polymer | | | Slump (inch) |
|---|---|---|---|---|
| | [I] | [II] | [III] | |
| 1 | 70 | 15 | 15 | 8.75 |
| 2 | 15 | 70 | 15 | 2.75 |
| 3 | 15 | 15 | 70 | 3.00 |
| 4 | 60 | 20 | 20 | 8.25 |
| 5 | 20 | 60 | 20 | 3.50 |
| 6 | 20 | 20 | 60 | 5.25 |
| 7 | 50 | 25 | 25 | 8.00 |

TABLE 6-continued

| Mix No. | Percentage of active polymer | | | Slump (inch) |
|---|---|---|---|---|
| | [I] | [II] | [III] | |
| 8 | 25 | 50 | 25 | 4.50 |
| 9 | 25 | 25 | 50 | 6.50 |

As shown in Table 6, it is clear that the slump is greatly affected by the relative ratios of the three polyoxyalkylene carboxylate polymers even the total quantities of these polymers in all mixes are equal.

Example 5

This example illustrates the effect of the relative amounts of the three polyoxyalkylene carboxylate polymers in concrete wherein the amount of dry sodium montmorillonite was 3.588 pounds or 0.25% by weight of sand. In these mixes, a fixed amount of sodium gluconate was used together with the polymers and the total amount of solid polycarboxylate polymers was 0.14% by weight of cement. The concrete composition and mixing procedure are identical to those described in Example 1, except that the total amount of water is 275 pounds, yielding a water/cement weight ratio of 0.423. The results are shown in Table 7 below.

TABLE 7

| Mix No. | Percentage of active polymer | | | Slump (inch) |
|---|---|---|---|---|
| | [I] | [II] | [III] | |
| 1 | 70 | 15 | 15 | 8.88 |
| 2 | 15 | 70 | 15 | 3.25 |
| 3 | 15 | 15 | 70 | 4.25 |
| 4 | 60 | 20 | 20 | 8.00 |
| 5 | 20 | 60 | 20 | 4.75 |
| 6 | 20 | 20 | 60 | 5.38 |
| 7 | 50 | 25 | 25 | 7.00 |
| 8 | 25 | 50 | 25 | 5.00 |
| 9 | 25 | 25 | 50 | 5.25 |

As shown in Table 7, it is clear that the slump is greatly affected by the relative ratios of the three polyoxyalkylene carboxylate polymers even in the presence of an additional water reducer and the total quantities of these polymers in all mixes are equal.

The foregoing examples and embodiments were presented for illustrative purposes only and not intended to limit the scope of the invention.

It is claimed:

1. A method for modifying a cementitious composition, comprising introducing into a hydratable cementitious composition three different carboxylate polymers, identified herein as Polymer I, Polymer II, and Polymer III, each of said polymers being obtained from Components A, B, and C, wherein:

Component A is an unsaturated carboxylic acid monomer represented by structural formula 1,

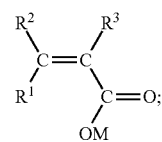

[formula 1]

Component B is a polyoxyalkylene monomer represented by structural formula 2:

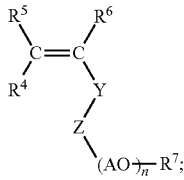

[formula 2]

Component C is an unsaturated carboxylate ester or amide monomer represented by structural formula 3:

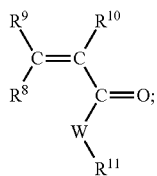

[formula 3]

wherein
$R^1$, $R^2$, $R^3$, $R^4$, $R^5$, $R^6$, $R^7$, $R^8$, $R^9$, and $R^{10}$ each individually represent a hydrogen atom, a $C_1$ to $C_4$ alkyl group, or —COOM group wherein M represents a hydrogen atom or an alkali metal;
Y represents —$(CH_2)_p$— wherein "p" represents an integer of 0 to 6;
Z represents —O—, —COO—, —OCO—, —COHN—, or —NHCO—;
-(AO)$_n$ represents repeating ethylene oxide groups, propylene oxide groups, butylene oxide groups, or a mixture thereof;
"n" represents the average number of repeating -(AO) groups and is an integer of from 10 to 250;
W represents an oxygen atom or an —NH— group, and $R^{11}$ represents a $C_1$-$C_{10}$ alkyl group or a $C_2$-$C_{10}$ hydroxyalkyl group;
wherein, in Polymer I, the Components A, B, and C are present in a molar ratio (A:B:C) in the range of 2:1:0 to 5:1:0;
and further wherein, in Polymer II, the Components A, B, and C are present in a molar ratio (A:B:C) in the range of 0.1:1:0 to 2:1:0; and
and further wherein, in Polymer III, the molar ratio of Component A to the sum of Components B and C is in the range (A:B+C) of 0.3:1 to 3:1.

2. The method of claim 1 wherein Polymers I, II, and III are simultaneously introduced into a cementitious composition at a concrete batch mix plant; at a job site; in a ready-mix truck during transport between plant and job site; or a combination thereof.

3. The method of claim 1 wherein one or more of Polymers I, II, and III are introduced into a cementitious composition at a concrete batch mix plant, and one or more of Polymers I, II, and III are introduced into a cementitious composition during transport in a ready-mix truck.

4. The method of claim 1 wherein the active weight percentages for each of Polymer I, Polymer II, and Polymer III, with respect to the sum of these three polymers within the composition, are as follows:
Polymer I is present in the range of 30-80%
Polymer II is present in the range of 5-40% and
Polymer III is present in the range of 5-50% range, all percentages herein based on total weight of the foregoing polymers within the composition.

5. The method of claim 1 wherein the active weight percentages for each of Polymer I, Polymer II, and Polymer III, with respect to the sum of these three polymers within the composition, are as follows:
Polymer I is present in the range of 35-75%;
Polymer II is present in the range of 10-35%; and
Polymer III is present in the range of 10-45%,
all percentages herein based on total weight of the foregoing polymers within the composition.

6. The method of claim 1 wherein, in Polymer I, the molar ratio of Component A to Component B is in the range (A:B) of 2.3:1 to 4.5:1.

7. The method of claim 1 wherein, in Polymer II, the molar ratio of Component A to Component B is in the range (A:B) of 0.6:1 to 1.7:1.

8. The method of claim 1 wherein, in Polymer III, the molar ratio of Component A to the sum of Components B and C is in the range (A:B+C) of 0.4:1 to 2:1.

9. The method of claim 1 wherein the weight-average molecular weight of Polymers I, II, and III is between 10,000 and 200,000.

10. The method of claim 1 wherein Component A comprises an acrylic acid, methacrylic acid, maleic acid, $C_1$-$C_4$ alkyl maleic monoester, maleic monoamide, N—($C_1$-$C_4$) alkyl maleic monoamide, fumaric acid, $C_1$-$C_4$ alkyl fumaric monoester, N—($C_1$-$C_4$) alkyl fumaric monoamide, crotonic acid, itaconic acid, or a mixture thereof.

11. The method of claim 1 wherein Component B comprises a poly(alkylene glycol)methyl ether acrylate, poly (alkylene glycol)ethyl ether acrylate, poly(alkylene glycol) methyl ether methacrylate, poly(alkylene glycol)ethyl ether methacrylate, poly(alkylene glycol)methyl ether maleate monoester, poly(alkylene glycol)methyl ether fumarate monoester, N-poly(alkylene glycol) acrylamide, N-poly (alkylene glycol) methacrylamide, poly(alkylene glycol) vinyl ether, poly(alkylene glycol) allyl ether, poly(alkylene glycol) methallyl ether, poly(alkylene glycol) isoprenyl ether, poly(alkylene glycol) vinyloxybutylene ether, or mixture thereof; and further wherein the nominal molecular weight of the polyalkylene glycol is in the range of 450 to 11,000.

12. The method of claim 11 wherein the nominal molecular weight of the polyalkylene glycol is in the range of 1,000 to 8,000.

13. The method of claim 1 wherein Component C comprises an alkyl (meth)acrylate, a hydroxyalkyl (meth)acrylate, (meth)acrylamide or derivative thereof, an alkyl maleic diester, a hydroxyalkyl maleic diester, or a mixture thereof.

14. The method of claim 1 further comprising introducing into the hydratable cementitious composition at least one conventional concrete admixture selected from the group consisting of water reducer, accelerator, retarder, strength enhancing agent, air detraining agent, air entraining agent, shrinkage reducing admixture, or a mixture thereof.

15. The method of claim 1 further comprising introducing into the hydratable cementitious composition a water reducer selected from the group consisting of lignosulfonates, naphthalene sulfonate formaldehyde condensates, melamine sulfonate formaldehyde condensates, gluconic acid or gluconate, corn syrup, or a mixture thereof.

* * * * *